(12) United States Patent
Jacobs

(10) Patent No.: US 12,504,832 B2
(45) Date of Patent: Dec. 23, 2025

(54) DETERMINING AND PRESENTING ACCESS KEYS FOR A CURRENT KEYBOARD LAYOUT

(71) Applicant: Microsoft Technology Licensing, LLC, Redmond, WA (US)

(72) Inventor: Daniel William Jacobs, Élancourt (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/805,399

(22) Filed: Aug. 14, 2024

(65) Prior Publication Data

US 2024/0402832 A1 Dec. 5, 2024

Related U.S. Application Data

(63) Continuation of application No. 17/850,736, filed on Jun. 27, 2022, now Pat. No. 12,079,397.

(51) Int. Cl.
*G06F 3/023* (2006.01)
*G06F 3/0489* (2022.01)

(52) U.S. Cl.
CPC .......... *G06F 3/0236* (2013.01); *G06F 3/0489* (2013.01)

(58) Field of Classification Search
CPC .... G06F 3/0236; G06F 3/0489; G06F 3/0238; G06F 3/04886
See application file for complete search history.

(56) References Cited

U.S. PATENT DOCUMENTS

| | | | | |
|---|---|---|---|---|
| 7,618,313 B2 * | 11/2009 | Ghaly | .................. | A63F 3/0421 463/9 |
| 10,237,509 B1 * | 3/2019 | Kim | ..................... | G02B 27/017 |
| 11,112,944 B1 * | 9/2021 | Simon | .................. | G06F 3/0482 |
| 2002/0190955 A1 * | 12/2002 | Chen | ...................... | G06F 3/0219 345/168 |
| 2003/0090471 A1 * | 5/2003 | Slaunwhite | ............. | G06F 3/023 715/847 |
| 2007/0061761 A1 * | 3/2007 | Lee | ......................... | G06F 9/451 715/837 |
| 2007/0162875 A1 * | 7/2007 | Paquette | ............... | G06F 3/0238 715/847 |
| 2008/0168367 A1 * | 7/2008 | Chaudhri | ............ | G06F 3/04817 715/764 |
| 2010/0115159 A1 * | 5/2010 | Cookson | ............... | G06F 3/0238 710/67 |

(Continued)

*Primary Examiner* — Ibrahim A Khan
(74) *Attorney, Agent, or Firm* — Ray Quinney & Nebeker P.C.; James S. Bullough

(57) ABSTRACT

The present disclosure relates to systems, methods, and computer-readable media for providing enhanced accessibility to access keys across a variety of keyboard layouts (or other character input devices). In particular, systems described herein involve determining access key characters to display in conjunction with selectable inputs via a graphical user interface (GUI) of a computing device where the access key characters are selectively determined based on display characters that are mapped to specific keys on a particular keyboard layout. This enables access key characters of all kinds (not limited to Latin-based types) to be provided in conjunction with selectable icons in a way that enables an individual to use the access keys with any type of keyboard or other input device.

20 Claims, 9 Drawing Sheets

(56) References Cited

U.S. PATENT DOCUMENTS

| | | | | |
|---|---|---|---|---|
| 2010/0201630 A1* | 8/2010 | Yang | G06F 3/0236 | 345/173 |
| 2010/0281410 A1* | 11/2010 | Heintze | G06F 3/0202 | 715/846 |
| 2010/0309133 A1* | 12/2010 | Gellersen | G06F 3/0238 | 715/769 |
| 2011/0016425 A1* | 1/2011 | Homburg | G06F 3/0482 | 715/811 |
| 2011/0248945 A1* | 10/2011 | Higashitani | G06F 3/018 | 345/173 |
| 2012/0133590 A1* | 5/2012 | Baek | G06F 3/04883 | 345/169 |
| 2012/0235912 A1* | 9/2012 | Laubach | G06F 3/0485 | 345/163 |
| 2012/0235917 A1* | 9/2012 | Miron | G06Q 40/06 | 345/168 |
| 2012/0235921 A1* | 9/2012 | Laubach | G06F 3/0482 | 345/172 |
| 2012/0326980 A1* | 12/2012 | Sonsino | G06F 3/04892 | 345/158 |
| 2013/0082935 A1* | 4/2013 | Duggan | G06F 3/04886 | 715/773 |
| 2014/0081430 A1* | 3/2014 | Timsjo | G05B 19/0426 | 700/83 |
| 2014/0123049 A1* | 5/2014 | Buxton | G06F 3/04883 | 715/773 |
| 2014/0215375 A1* | 7/2014 | Dong | G06F 3/04847 | 715/773 |
| 2015/0058776 A1* | 2/2015 | Liu | G06F 3/0238 | 715/771 |
| 2015/0084871 A1* | 3/2015 | Yarvis | G06F 3/04886 | 345/172 |
| 2015/0347005 A1* | 12/2015 | Hou | G06F 3/04886 | 715/773 |
| 2017/0249072 A1* | 8/2017 | Martin | G06F 40/221 | |
| 2018/0129396 A1* | 5/2018 | Buckley | G06F 3/04895 | |
| 2019/0079668 A1* | 3/2019 | Rao | G06F 3/04883 | |
| 2019/0332186 A1* | 10/2019 | Petersen | G06F 3/0202 | |
| 2020/0159290 A1* | 5/2020 | Seibert | G06F 3/147 | |
| 2022/0382430 A1* | 12/2022 | Xu | G06F 3/0219 | |
| 2023/0376124 A1* | 11/2023 | Molla | G06F 3/018 | |

\* cited by examiner

DETERMINING AND PRESENTING ACCESS KEYS FOR A CURRENT KEYBOARD LAYOUT

CROSS-REFERENCE TO RELATED APPLICATIONS

This application is a Continuation of U.S. patent application Ser. No. 17/850,736, filed Jun. 27, 2022, the disclosure of which is incorporated herein by reference in its entirety.

BACKGROUND

Recent years have seen rapid development in computing devices (e.g., mobile devices, personal computers, server devices) to perform a variety of different tasks. Indeed, as computing devices continue to develop, more and more individuals are using computing devices in routine and everyday tasks. With this increase in use of computing devices by a growing number and variety of individuals, accessibility to an ever-increasing number of applications and features continues to be a concern. For example, a wide variety of applications make use of shortcuts, such as keyboard shortcuts. These shortcuts enable a user to actuate various features and functionality of software applications that are installed or otherwise running on computing devices.

While many applications make use of different keyboard shortcuts (e.g., access keys, keyboard accelerators), many individuals are unable to access these shortcuts for a variety of reasons. For example, many keyboard shortcuts are limited to specific operating systems or to specific computing devices. In some examples, keyboard shortcuts are limited to those applications for which those shortcuts have been specifically configured or developed by creators of a specific application. In other examples, keyboard shortcuts may be available, but are limited to specific input devices or keyboard layouts. As a result, many users are excluded from utilizing shortcuts and other application enhancements that provide accessibility to the full range of capabilities provided by computing devices.

These and other problems exist with regard to providing accessibility to various application functions, and particularly to keyboard shortcuts.

DETAILED DESCRIPTION

Figure 1:
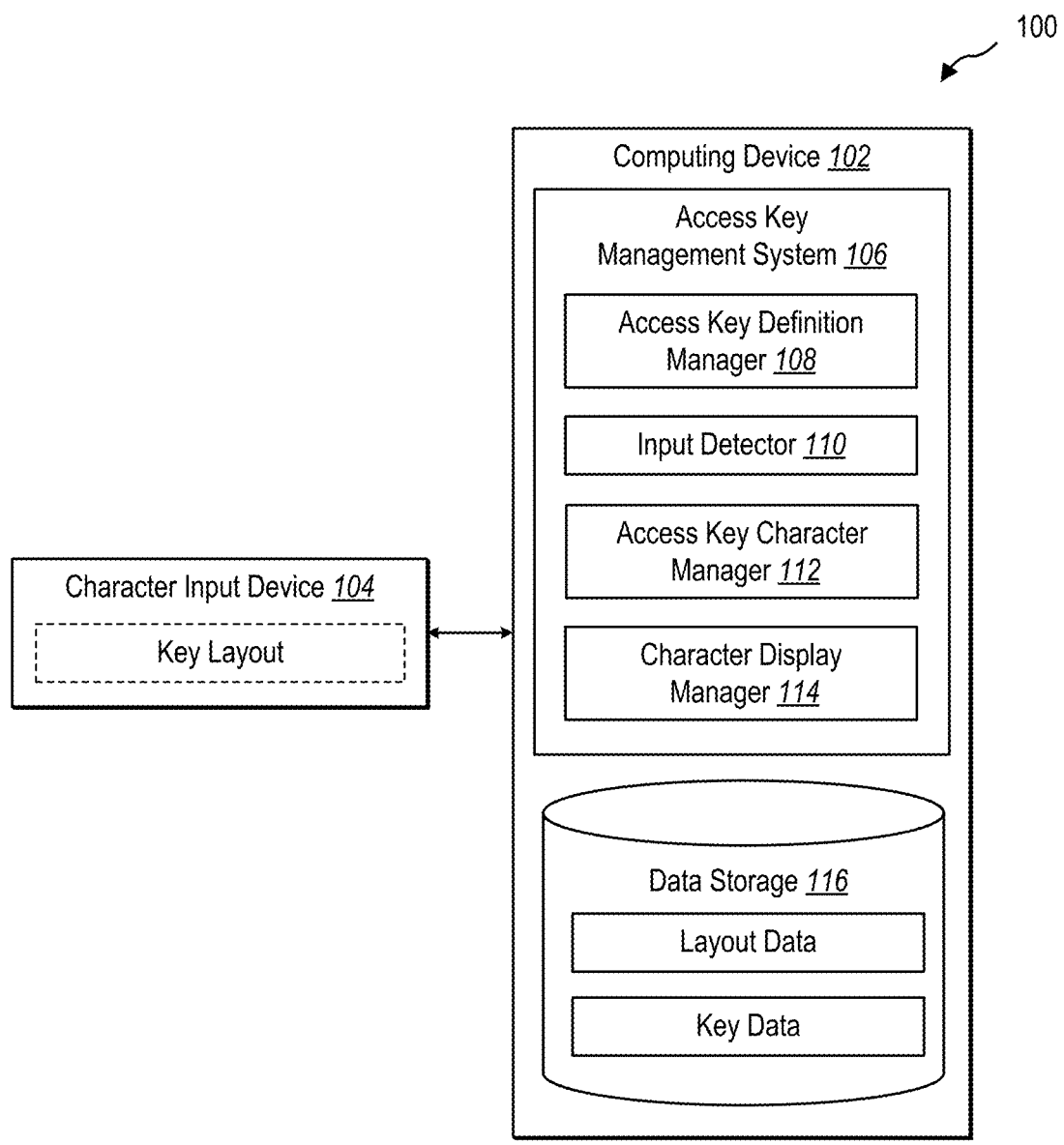
FIG. 1 illustrates an example environment including a character input device (e.g., a keyboard) and a computing device having an access key management system implemented thereon.

The present disclosure relates generally to systems, methods, and computer-readable media for selectively determining access key characters to display in connection with providing access key shortcuts across a variety of keyboard layouts (or other character input device layouts). In particular, one or more embodiments described herein involve an access key management system capable of determining access key characters for virtually any keyboard layout (e.g., any of a variety of languages) in a way that allows access key characters that match the display characters on the keyboard layout(s) to be displayed in a way that avoids key conflicts and which allows a user of a particular keyboard layout to know which key to press in actuating a corresponding access key command. As will be discussed below, features and functionalities described herein are widely applicable to any number of a variety of keyboard layouts.

As an illustrative example, an access key management system may generate a plurality of access key definitions for a character input device (e.g., a keyboard device, a virtual keyboard) by associating virtual keys with corresponding input commands. At runtime of an application (or operating system (OS)), the access key management system can identify a plurality of selectable inputs that are presented via a graphical user interface of a computing device. The access key management system may further determine access key commands and associated access key characters for display. As will be discussed below, determining an access key character may be based on one or multiple display characters for a key location of an associated virtual key based on a current layout of the character input device. The access key management system may then cause the access key character(s) to be presented via the graphical user interface at the locations of the corresponding selectable inputs.

As will be discussed in further detail below, the present disclosure includes a number of practical applications having features and functionality described herein that provide benefits and/or solve problems associated with determining and presenting characters in connection with access key shortcuts on a computing device. Examples of some of these features and associated benefits are discussed in further detail below.

For example, by mapping access key commands to virtual keys, the access key management system facilitates generation of access command definitions that are not localized to specific characters or symbols at corresponding key locations. In particular, where virtual keys are often associated with the same key location across different layouts, access keys can be defined to be assigned to a corresponding virtual key independent from the actual display characters associated with the different layouts. In this way, where a specific display character may be located at various locations from layout to layout, the access key command remains assigned to a corresponding virtual key, resulting in a non-localized definition of the access key.

By defining the access keys as being associated with corresponding virtual keys, this also eliminates the possibility of key conflicts when presenting access key characters on a graphical user interface of an application. For example, and as will be discussed in further detail below, the access key management system may assign access key commands having a 1:1 association with virtual keys to corresponding inputs (e.g., selectable or displayed inputs), which eliminates the possibility that a base character, a shift character, or other character corresponding to the same virtual key is assigned to two different selectable inputs.

The access key management system may additionally enable determination of an access key command and corresponding access key character for a corresponding device layout (e.g., keyboard layout) without requiring further development of a specific application and independent from the language of the characters actually displayed on the graphical user interface. In this way, even where a display language of an application is Latin-based, the access key management system may nonetheless provide a display of access key characters when a user is using a non-Latin based keyboard layout. This allows a user to see which of the characters on a character input device is applicable to a corresponding selectable input, even where the display of text corresponding to the selectable input is different from a language of the user or, more specifically, the language of the keyboard layout.

In addition, one or more embodiments of the access key management system involve identifying inputs, determining access characters, and causing the characters to be displayed at runtime of an application on a computing device. In this way, the access key management system provides additional flexibility in presenting access key characters without requiring additional development for an application in accommodating input key character layouts across a wide variety of languages and configurations. In addition, the runtime nature of the features described herein enable the access key commands and corresponding characters to be determined on the fly as a presentation of a graphical user interface changes, such as in response to opening a new window, selecting a menu option that prompts presentation of a sub-menu, or any other modification of selectable inputs to be displayed on a graphical user interface of an application. As noted above, this additional flexibility is provided without modifying an existing framework of an operating system and without requiring that an application developer specifically employ further development of an application beyond what is normally or already done.

As illustrated in the foregoing discussion, the present disclosure utilizes a variety of terms to describe features and advantages of the systems described herein. Additional detail is now provided regarding the meaning of some of these terms. For example, as used herein, a "computing device" or "client device" may refer to any type of electronic device capable of running an application and providing a display of selectable inputs via a graphical user interface. A computing device may refer to a mobile device such as a mobile telephone, a smart phone, a personal digital assistant (PDA), a tablet, a laptop, or wearable computing device. A computing device may further refer to one or more non-mobile devices such as a desktop computer, a server (e.g., a cloud server), or other non-portable device. Additional detail in connection with an example computing devices is discussed below in connection with FIG. 8.

As used herein, a "character input device" refers herein to any device configured to provide input characters or other input commands to a computing device. A character input device may refer to any input device having buttons or selectable icons that, when actuated, causes the input device to provide a character input, such as a letter, number, symbol, or other displayable character to be input to the computing device. In one or more embodiments, a character input device refers specifically to a keyboard, such as a physical keyboard coupled to a computing device or a virtual keyboard provided via a graphical user interface of the client device. Nevertheless, other implementations may include other types of devices capable of providing character inputs (e.g., gaming controllers, keypads, or other input devices having a capability to provide characters or character symbols as input commands).

In one or more embodiments, a character input device includes an input device layout. As used herein, an "input device layout" or "device layout" refers to a configuration of a character input device in which certain keys or key locations are associated with different inputs or characters. For example, in the context of keyboards, a keyboard layout may refer to a common layout, such as a QWERTY keyboard for Latin-based characters. In one or more embodiments described herein, the keyboard layout is associated with a particular language (e.g., English, Greek, Azerbaijani, Russian, Malayalam, Arabic, Japanese). Other keyboard layouts may refer to different languages and may include different characters that are mapped to different locations. Indeed, a keyboard layout may refer to any configuration of keys and key locations associated with language or orientation of characters. In one or more embodiments, a device layout can be a custom layout created by a specific individual.

As used herein, an "active layout," "active character layout," or "active device layout" may refer interchangeably to a selected or otherwise applicable layout for an application or OS. For example, an active layout may refer to a default keyboard layout, such as a QWERTY keyboard layout (or some variation thereof). Alternatively, an active layout may refer to a specific keyboard layout selected at some previous time before or when an application is opened on the computing device. In one or more examples described herein, an active layout may refer to a specific language or base of characters other than the widely used Latin-based character layout.

As used herein, a "virtual key" refers to a set of one or more commands that are associated with a corresponding key location. In one or more embodiments described herein, a virtual key is associated with a corresponding location on a character input device (e.g., a key location on a keyboard template). The virtual key may be associated with a plurality of Unicode characters corresponding to the key location. For example, as will be discussed below, a virtual key may be associated with a base character, a shift character, and one or more additional characters depending on a specific device layout. While the virtual key may be associated with a specific key location, it will be appreciated that the virtual key may be associated with a different set of characters for each of a plurality of device layouts. In addition, while the orientation of virtual keys may be uniform across a large number of input devices and device layouts, there may be some variation, particularly where a specific keyboard type or keyboard layout has additional or fewer buttons. Nevertheless, locations of the virtual keys are mostly uniform across a large number of similar device types (e.g., keyboards).

As used herein, an "access key definition" refers to an association of a command (e.g., an access key command) and a corresponding virtual key. As used herein, an access key command may refer to an abstraction of a command for an access key whose location and corresponding character(s) is to be determined based on a current layout of an input device. Additional information in connection with an access key definition and access key commands will be discussed in connection with a number of examples below.

As used herein, a "selectable input" or "displayed input" may refer to any input that can be selected or otherwise actuated using a button or cursor and which is displayed on at least a portion of a graphical user interface of an application. In one or more embodiments described herein, a selectable input refers to a selectable icon that may be selected with a cursor or via a touch screen by interacting with the selectable icon. By way of example and not limitation, a selectable icon may refer to one of a plurality of menu icons that, when selected, cause another menu (e.g., a drop down menu) of additional options to select. As will be discussed herein, an access key management system may detect or otherwise identify a set of selectable icons based on movement of a viewable area of the graphical user interface, a detected selection of a selectable icon, or any action taken by a user that causes a modification to a set of selectable icons to appear on a graphical user interface of an application.

As used herein, an "access key character" refers to a character that is displayed or otherwise presented in connection with an associated selectable input. As will be discussed in further detail below, the access key management system may determine an access key character to be displayed at a location on a graphical user interface based on a variety of factors including characters associated with a given virtual key as well as a device layout (e.g., an active device layout).

Additional detail will now be provided regarding implementations of an access key management system disclosed herein for determining access key characters to display in connection with selectable inputs via a graphical user interface (GUI) of a computing device (e.g., a GUI of an application or operating system (OS) on the computing device). For example, FIG. 1 illustrates an example environment 100 including a computing device 102 and a character input device 104 coupled to the computing device 102.

As noted above, the computing device 102 and the character input device 104 may refer to a variety of electronic devices capable of communicating input data between one another. While other types of devices may be used in connection with the embodiments described herein, in one or more implementations, the computing device 102 specifically refers to a client device while the character input device 104 refers to an input device having a particular key layout (e.g., Latin-based character layout, non-Latin based character layout). The computing device 102 and the character input device 104 may be coupled using a wired or wireless connection. For example, in one or more implementations, the devices may be coupled via a wire or other physical transmission medium. Other implementations may involve the devices being coupled wirelessly or remotely, such as via a local network, a peer-to-peer connection, a Bluetooth connection, the Internet, or any other network connection over which the computing device 102 and character input device 104 can communicate data (e.g., input data).

As further shown in FIG. 1, the computing device 102 may include an access key management system 106 implemented thereon. As shown in FIG. 1, the access key management system 106 may include a number of components including an access key definition manager 108, an input detector 110, an access key character manager 112, and a character display manager 114. As further shown, the access key management system 106 may access a variety of data on a data storage 116 implemented on or otherwise accessible to the components of the access key management system 106. Additional information will be discussed in connection with each of the respective components 108-114 of the access key management system 106.

For example, the access key definition manager 108 may provide a variety of features related to determining or otherwise generating a plurality of access key definitions for a character input device 104. In one or more embodiments, the access key definition manager 108 may generate a collection of access key definitions by associating access key commands with corresponding virtual keys. For example, in one or more embodiments, the access key definition manager 108 generates a table of entries or definitions (e.g., access key definitions) including a mapping between each virtual key and an access key command.

As noted above, the virtual keys may be mapped to specific key locations on a key layout of the character input device 104. Each of the virtual keys may additionally be associated with different characters and commands depending on an active layout for the character input device 104. The access key commands may be non-localized and assignable to any selectable input in a way that is independent of display characters associated with the corresponding selectable inputs. Each of the virtual keys and associated access key commands may be independent from an active character layout.

As noted above, the access key management system 106 further includes an input detector 110. In one or more embodiments, the input detector 110 may identify any number of selectable inputs presented via a GUI of an application. As used herein, a GUI of an application may refer to a display area associated with a corresponding application, such as a window or multiple windows. In one or more embodiments, a GUI of a device may refer to a total display area for the computing device 102, which may include multiple display areas of corresponding applications. In one or more embodiments, an application refers to a software application that provides a corresponding application GUI. In one or more embodiments, the application refers to an OS of the computing device 102, in which case an application GUI may refer to one or multiple GUIs associated with different applications running on the OS that are displayed via a display area of the computing device 102. Nevertheless, while a GUI may refer to a GUI of an application, OS, or device, features described in connection with a specific type of GUI (e.g., a GUI of an application) may similarly apply to any type of GUI described herein.

In one or more embodiments, the input detector 110 identifies a set of selectable inputs based on a current display of icons or objects that can be selected (e.g., by a cursor or touch input associated with a location of the icon(s) on the GUI). For example, the input detector 110 may identify any number of selectable icons that are presented via a GUI of an application and/or device. In one or more embodiments, the input detector 110 identifies selectable icons based on data provided by an application, such as an identification of selectable icons for a given display area. Additional information in connection with identifying a set of selectable inputs, including triggers that prompt identification of a set of selectable inputs, will be discussed in further detail below (e.g., in connection with FIGS. 3A-3B).

As mentioned above, and as further shown in FIG. 1, the access key management system 106 includes an access key character manager 112. The access key character manager 112 is configured to determine access key commands and associated access key characters to display in connection with the identified selectable inputs via the GUI(s). In one or more embodiments, the access key character manager 112 may determine an access key command and corresponding access key character for each of a plurality of selectable inputs that are provided via the GUI of the application.

Determining the specific access key character to display alongside the selectable inputs may be based on a variety of factors and conditions. For example, in one or more embodiments, the access key character may be determined based on one or more display characters that are assigned to a virtual key that is associated with a corresponding access key command. For example, where a first access key command is identified for a first selectable input, the access key character manager 112 may identify that the first access key command is associated with a first virtual key. The access key character manager 112 may further identify an active character layout (e.g., a type of keyboard layout that is selected or active) and determine a set of display characters associated with the first virtual key. The access key character manager 112 may then select one of the display characters to display as the access key character alongside a display of the selectable input. Additional information in connection with determining the access key(s) will be discussed below (e.g., in connection with FIGS. 4-5 and FIGS. 6A-6B).

As mentioned above, and as further shown in FIG. 1, the access key management system 106 may include a character display manager 114. The character display manager 114 may cause an access key character to be displayed in conjunction with a corresponding selectable input. For example, the character display manager 114 may cause a plurality of access key commands to be displayed alongside a corresponding plurality of selectable inputs. The character display manager 114 may provide characters that correspond to the active character layout of the character input device 104 independent of a language or symbols of the characters displayed via the GUI of the application. Additional information in connection with which characters are displayed and how the display may be modified at runtime will be discussed below in connection with further examples and figures.

Each of the components 108-114 of the access key management system 106 may utilize data stored or otherwise accessible to the computing device 102. For example, as shown in FIG. 1, the computing device 102 may include a data storage 116 having a variety of data thereon which may be used by the respective components 108-114 to perform features and functionalities described herein.

As shown in FIG. 1, the data storage 116 may include layout data. The layout data may include any data associated with the character input device 104 including a selected layout and any information associated therewith. This may include location of specific characters and codes associated with the respective keys. The layout data may include a selected language and corresponding characters of the character input device 104.

As further shown in FIG. 1, the data storage 116 may include key data. The key data may include virtual key data, including any characters or codes that are associated with corresponding virtual keys. The key data may further include access key data, such as access key definitions and associations between access key commands and corresponding virtual keys. The key data may be stored and access or may be generated at runtime and on the fly in accordance with one or more embodiments described herein.

The components 108-114 of the access key management system 106 may include software, hardware, or both. For example, the components of the access key management system 106 and/or character input device 104 may include one or more instructions stored on a computer-readable storage medium and be executable by processors of one or more computing devices. When executed by the one or more processors, the computer-executable instructions of the device(s) can cause the computing device 102 to perform the methods described herein. Alternatively, the components of the access key management system 106 can comprise hardware, such as a special-purpose processing device to perform a certain function or group of functions. Additionally, or alternatively, the components of the access key management system 106 can include a combination of computer-executable instructions and hardware.

Moreover, while FIG. 1 illustrates an example in which the access key management system 106 is implemented on a computing device 102, it will be appreciated that one or more of the components 108-114 of the access key management system 106 may be implemented on a different device or across multiple devices. As an example, one or more features of respective components may be implemented on the character input device 104 or on a remote computing device, such as a server device. In one or more embodiments, one or more components 108-114 of the access key management system 106 may be implemented as part of a web application (e.g., a web browser) or other remotely accessible application hosted by a server device, such as by a device on a cloud computing system.

As another example, in one or more implementations, the environment 100 may include a character input mechanism implemented as part of the computing device 102, such as an integrated keyboard or a character input portion of a graphical user interface. For instance, in one or more embodiments, a virtual keyboard may be displayed over a portion of a GUI of the computing device 102 which may include key characters based on an active keyboard layout. In this example, similar to other examples, the access key characters may be displayed and selected based on detecting inputs of a user with respect to the displayed keys via the virtual keyboard.

Figure 2:
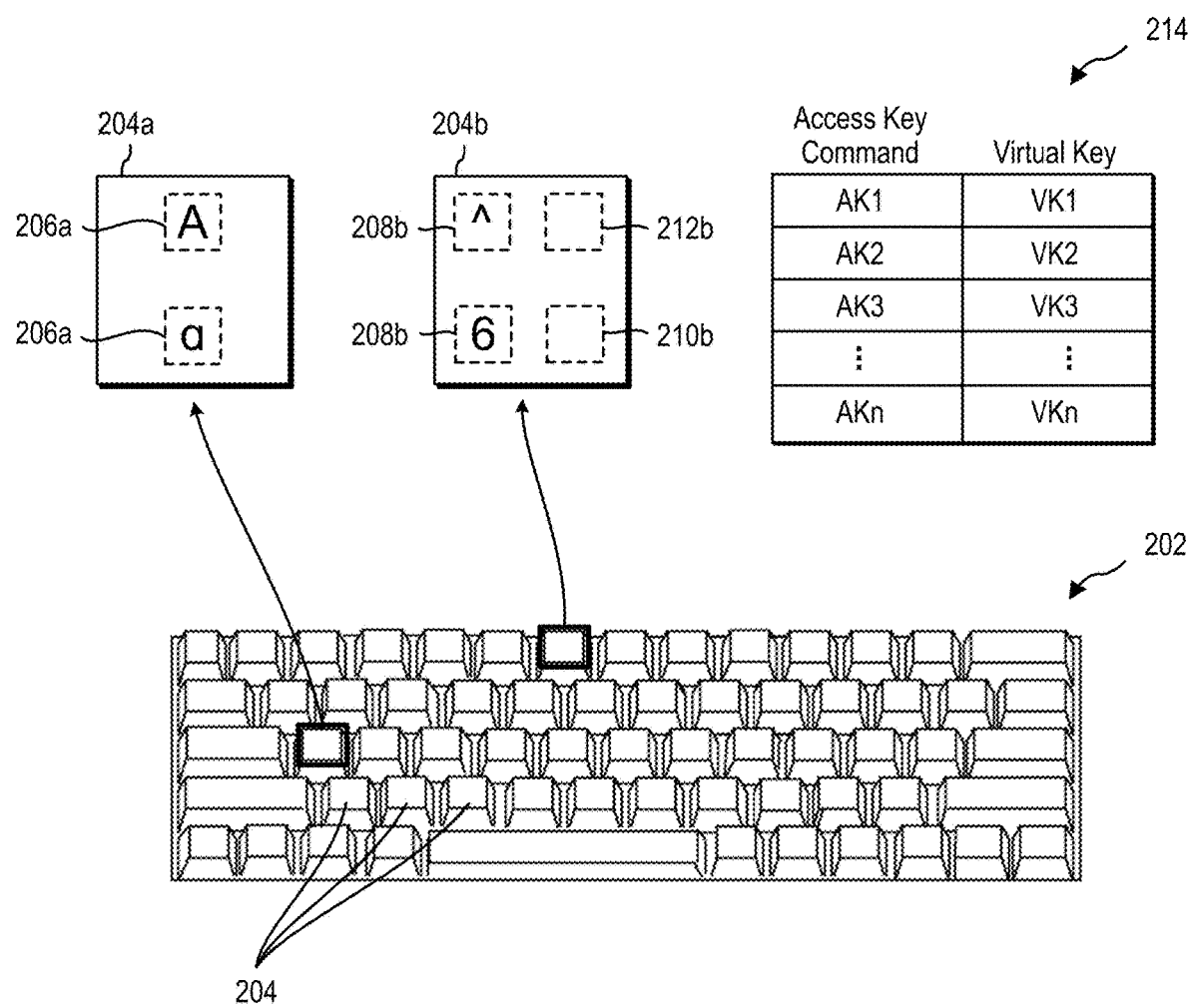
FIG. 2 illustrates an example implementation in which the access key management system determines access key definitions in accordance with one or more embodiments.

FIG. 2 illustrates an example set of features associated with a keyboard layout and virtual key data associated with key locations of the keyboard layout. For example, FIG. 2 illustrates an example keyboard layout 202 including locations of individual keys 204 as well as characters and key data (e.g., key codes, key characters) corresponding to virtual keys that are associated with the various key locations. While keyboard layouts may have some differences from keyboard to keyboard, for ease in explanation, features and functionality of the access key management system 106 will be discussed in connection with keyboards having a similar physical layout as the keyboard layout 202 shown in FIG. 2.

By way of illustration, FIG. 2 shows two keys 204a-b having corresponding sets of characters. The keys 204a-b may represent example virtual keys in accordance with one or more embodiments. As shown in FIG. 2, the keys 204a-b may correspond to a specific key location on the keyboard layout 202. While not shown in FIG. 2, the keyboard layout 202 may refer to any keyboard layout associated with any display language and may include any variety of characters displayed thereon.

Each of the keys may include or produce a number of different characters which may differ from key to key. For example, a first key 204a may include a base character 206a and a shift character 208a. In this example, where the virtual key 204a refers generally to the "a" key, the base character 206a may be the lower-case "a" value while the shift character 208a may be the upper-case "A" value. The base and shift characters may refer to character values (e.g., character code values) that are provided to the computing device when the key is selected either by itself or in combination with some modification key (e.g., shift, alt, control keys). In one or more examples described herein, the base character refers to a character of a key when the key is pressed without any additional keys. Conversely, the shift character may refer to a character of a key when the key is pressed in combination with a shift key.

While the first key 204a refers to a key having alphabet characters, a second key 204b refers to a second example key having numeric characters. As shown in FIG. 2, the second key 204b may include a base character 206a, a shift character 208b, and one or more additional characters 210b, 212b. Each of the respective characters 206b-212b may refer to a character that may be selected using the same virtual key based on one or more modification keys that are pressed in combination with the second key 204b. In this example, a base character 206b is associated with a "6" symbol, a shift character 208b is associated with a "A" symbol, and third and fourth characters 210b-212b may be associated with any other symbol depending on a specific configuration of the keyboard layout 202. In one or more embodiments, the different symbols may be configured or otherwise added to a keyboard layout.

As noted above, each of the access key commands may be assigned or otherwise associated with a corresponding virtual key that is pre-associated with a corresponding key location on the keyboard layout 202. As shown in FIG. 2, the access key management system 106 may generate and maintain a set of access key definitions 214 in which access key commands (e.g., AK1-AKn) are associated with a set of virtual keys (VK1-VKn). Set of access key definitions 214 may be applicable to any of a variety of keyboard layouts even where the specific characters on the respective keys differ from layout to layout.

Moving on, additional information will now be discussed in connection with identifying selectable inputs on a GUI. In particular, FIGS. 3A-3B illustrate example computing devices 302 having a GUI 304 displayed thereon showing different examples of selectable options that may appear on a display of the computing device 302.

Figure 3A:
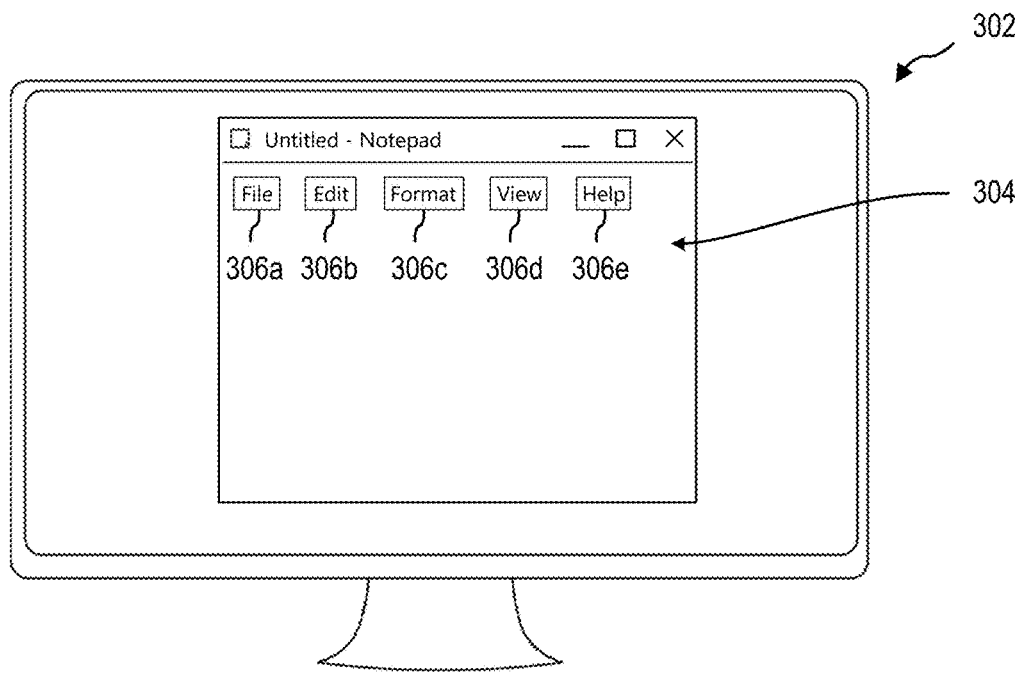
FIG. 3A-3B illustrate a series of graphical user interfaces showing an example presentation of selectable inputs in accordance with one or more embodiments.
Figure 3B:
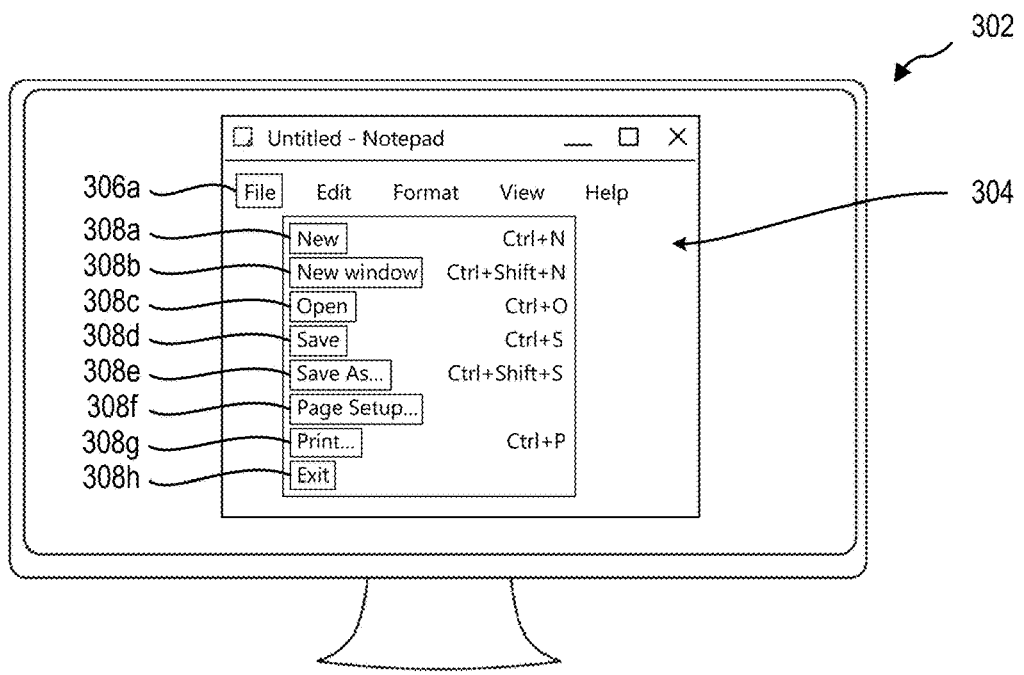

As shown in FIG. 3A, a first example shows a GUI 304 of a notepad application including a plurality of menu options 306a-c. For example, the menu options include a first selectable input 306a associated with accessing a file menu, a second selectable input 306b associated with accessing an edit menu, a third selectable input 306c associated with accessing a format menu, a fourth selectable input 306d associated with accessing a view menu, and a fifth selectable input 306e associated with accessing a help menu.

As discussed in one or more embodiments, the access key management system 106 may identify the selectable menu options 306a-e at runtime while the application is executing on the computing device 302. In one or more embodiments, the access key management system 106 receives an indication from the application (e.g., the notepad application) of any selectable inputs that are displayed via the GUI 304 of the application. In one or more embodiments, the access key management system 106 may simply identify any number of the displayable inputs that are currently displayed via a display area on the computing device 302.

One benefit of identifying the selectable inputs at runtime is that the access key management system 106 can identify additional selectable inputs as the presentation of inputs is modified. For example, as a displayable area is modified as a result of scrolling through or shifting a display, the access key management system 106 can determine an updated set of selectable inputs. Alternatively, in one or more embodiments, the access key management system 106 determines an updated set of selectable options based on selection of a selectable option that prompts display of additional selectable icons (e.g., a menu or sub-menu of selectable icons).

For example, as shown in FIG. 3B, in response to detecting selection of the first selectable input 306a associated with accessing a file menu, the notepad application may provide a display of additional selectable inputs 308a-h corresponding to different actions that can be taken within the notepad application. In this example, the access key management system 106 may identify the listing of selectable inputs 308a-h based on detecting the selection of the file menu icon or, alternatively, based on detecting a modification to the display that involves presentation of additional selectable icons.

The example shown in FIG. 3B is provided by way of example and not limitation. In this example, the listing of selectable inputs 308a-h includes a first selectable input 308a associated with creating a new file, a second selectable input 308b associated with opening a new window, a third selectable input 308c associated with opening a new document, a fourth selectable input 308d associated with saving a current document, a fifth selectable input 308e associated with saving a copy of a current document, a sixth selectable input 308f associated with page setup settings, a seventh selectable input 308g associating with printing a document, and an eighth selectable input 308h associated with exiting the notepad application.

While the GUI 304 shown in FIG. 3B illustrates a number of keyboard accelerators (e.g., "Ctrl+N", "Ctrl+Shift+N", etc.) that may be activated in connection with the specific inputs, it will be understood that these may be treated separately and distinctly from the access keys and access key characters discussed in connection with one or more embodiments herein. For example, these keyboard accelerators may be displayed in a different language from the access key characters that are determined for the respective selectable inputs in accordance with one or more embodiments described herein. Nevertheless, while not the case in all embodiments, in some implementations, the characters used to indicate specific keyboard accelerators may be selected and presented in a similar manner as the access key characters and provide a hint to a user of the computing device as to a key that can be used for a corresponding keyboard layout in connection with keyboard accelerators.

Additional detail will now be discussed in connection with determining a key command character to display in connection with a selectable option that is displayed via a display area of a computing device. As noted above, each virtual key may be associated with a key location on a physical layout of keys (e.g., a layout template). In addition, upon selection of an active layout (or based on a previous selection of the active layout), the virtual key may become associated with a set of characters that correspond to key codes that are provided to the computing device upon activation of the associated key. As will be discussed below, the access key management system 106 may determine one of the characters from the set of characters to display as an access key command via the GUI. Moreover, it will be appreciated that the key command is determined at runtime based on a currently active keyboard layout, and in accordance with a set of selectable inputs that are currently selectable via interactions with the GUI.

Figure 4:
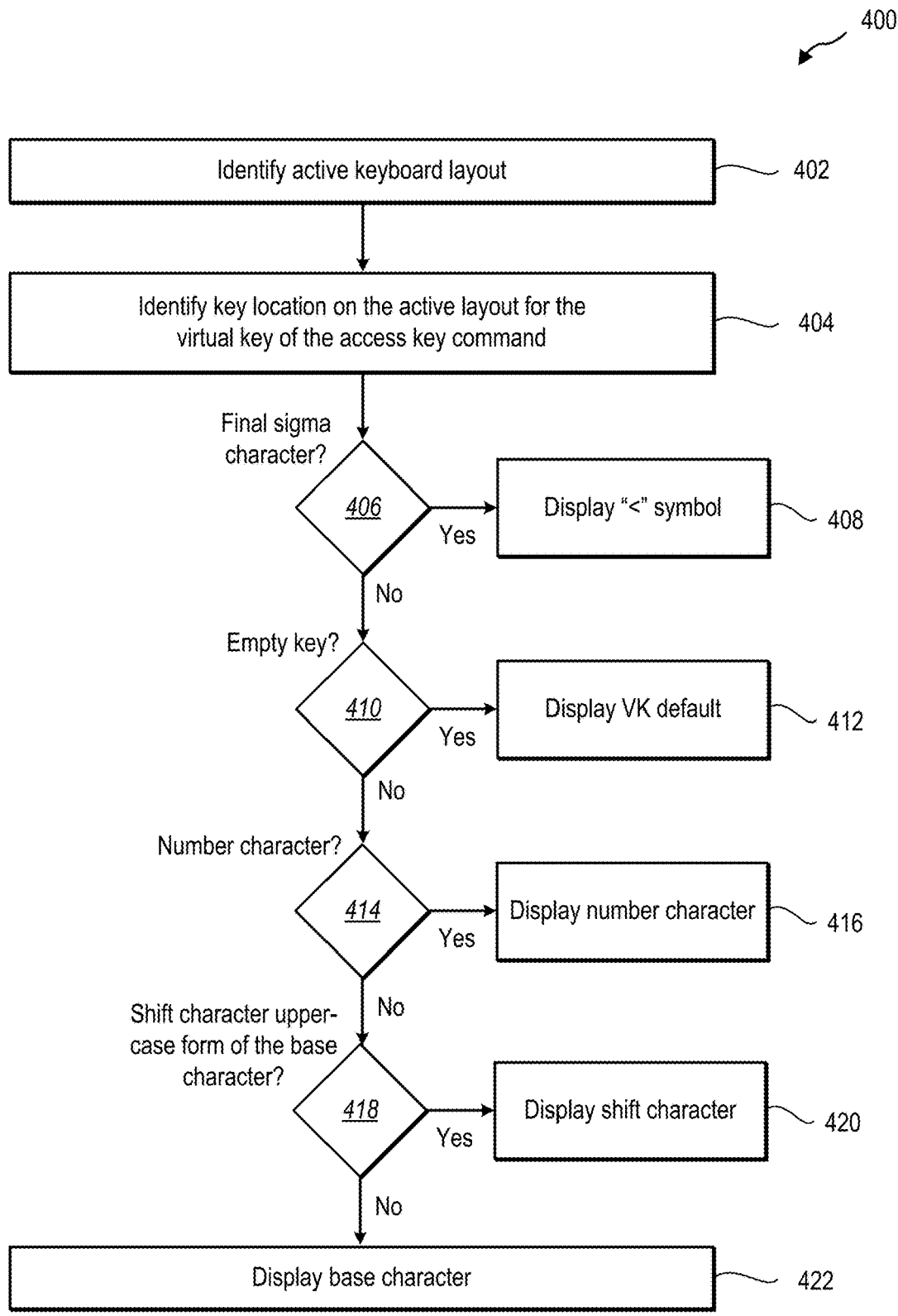
FIG. 4 illustrates a series of acts related to determining access key characters for corresponding access key commands to display via a graphical user interface in accordance with one or more embodiments.

As an example, FIG. 4 illustrates a series of acts 400 that may be applied in performing an analysis of a set of display characters and determining an access key character to display for a corresponding key location or a virtual key. As shown in FIG. 4, the access key management system 106 may perform an act 402 of identifying an active keyboard layout. As noted above, this may involve determining whether a default keyboard layout is applicable (e.g., a Latin-based layout) or whether an alternative layout has been selected, such as a specific language or custom layout of keys and corresponding key characters.

In addition to identifying the active keyboard layout, the access key management system 106 may perform an act 404 of identifying a key location on the active layout for the virtual key of an access key command. As noted above, this identification of key location on the active layout may be done for each access command from a set of access command definitions. Upon identifying the key location and corresponding characters thereon, the key management system 106 may consider a number of factors in determining the specific access key character to display in connection with a selectable input.

For example, the key management system 106 may perform an act 406 of determining whether the identified key location on the active layout includes a final sigma character (ς) (e.g., found on the VK_W virtual key on a Greek-language keyboard layout). If the key location includes the final sigma character (ς), the key management system 106 may perform an act 408 of displaying the less than (<) symbol at a location of the associated selectable input. This particular use-case is beneficial as sigma has three associated versions of characters or symbols (e.g., a base sigma character, shift sigma character, and final sigma character) where other characters generally have two associated character versions (e.g., base character and shift character).

Alternatively, in the event that the key management system 106 determines that the identified key location on the active layout does not include a final sigma character (ς), the key management system 106 may perform an act 410 of determining whether the key character is an empty key. As used herein, an empty key refers to a key location on a keyboard layout that is not mapped to any specific symbols. For example, an empty key may refer to a blank key on a corresponding keyboard layout that has no associated character input.

Nevertheless, as each key location is mapped to a corresponding virtual key, the empty key may be associated with a default or base virtual key character. Accordingly, as shown in FIG. 4, in the event that the key management system 106 determines that the identified key location is an empty key, the key management system 106 may perform an act 412 of displaying a virtual key default symbol of the virtual key. While not shown in the attached figures, each virtual key may be associated with a corresponding default character. For example, in the event the identified key location is an empty key, the access key character may be determined to be a base character from a default layout (e.g., a Latin-based keyboard layout, or a standard QWERTY layout).

In the event that the identified key location on the active layout does not include a final sigma (ς) character and is not an empty key, the key management system 106 may perform an act 414 of determining whether a character associated with the key location is a numerical symbol (e.g., a single-digit numerical symbol from "0" to "9"). In one or more embodiments, the key management system 106 specifically determines whether a base character or a shift character includes a numerical symbol (while ignoring other symbols other than the base and shift characters that may otherwise be mapped to the key location). Where the key management system 106 determines that the set of characters associated with the key location include a numeric value, the key management system 106 may perform an act 416 of displaying the number character at the location of the associated selectable input.

Alternatively, where the set of characters for the key location does not include a final sigma character (ς) or a numeric character, and where the key is not an empty key, the key management system 106 may perform an act 418 of determining whether the shift character for the key location is the upper-case form of the base character. Where the key management system 106 determines that the shift character for the key location is the upper-case form of the base character, the key management system 106 may perform an act 420 of displaying the shift character. This is beneficial as the capital version of a letter is often more distinct and recognizable over the lower-case version of the letter and many operating systems treats capital and lower-case forms of a letter as equivalent for access key purposes. Accordingly, the key management system 106 can present the capital version of a letter without requiring that a user of a computing device press a shift key.

Alternatively, where the key management system does not determine that the shift character for the key location is the upper-case form of the base character, the key management system 106 may perform an act 422 of displaying a base character. Thus, as shown in FIG. 4, where a key location does not include a final sigma character (ς), an empty key, a numeric character, or a shift character that is the upper-case form of the base character, the key management system 106 may default to displaying a base character.

Figure 5:
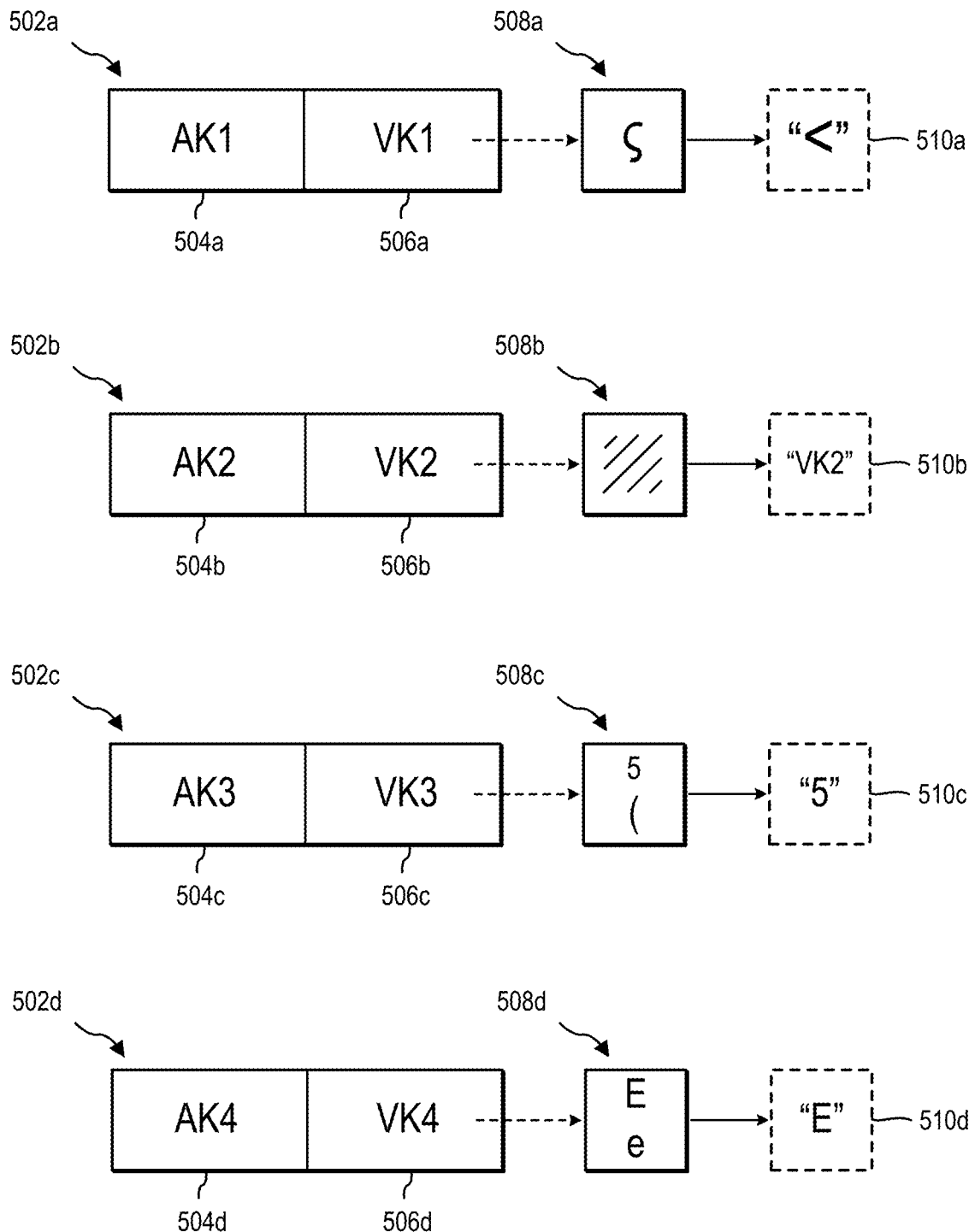
FIG. 5 illustrates example implementations showing selection of access key characters from sets of possible display characters in accordance with one or more embodiments.

While FIG. 4 illustrates an example decision process involved in determining an access key character to display, FIG. 5 illustrates a number of use-cases applicable to the series of acts 400 discussed above in connection with FIG. 4. For example, FIG. 5 shows use-cases associated with a final sigma character (ς), an empty key, a numeric key, and an alphabetic key.

As a first example, FIG. 5 shows a first access key definition 502a including a first access key command 504a and a first virtual key 506a associated with the first access key command 504a. As shown in FIG. 5, the virtual key 506a is associated with a specific key location which, in the present example, has a signal character mapped thereto based on a specific mapping of the keyboard layout. In the current example, the first virtual key 506a is mapped to a first key location 508a having a final sigma symbol "ς" mapped thereto. As shown in FIG. 5, the key management system 106 identifies a first access key character 510a based on the series of acts 400 described above in FIG. 4. For example, as indicated in the series of acts 400 discussed above, where the key management system 106 identifies that the key location is mapped to a final sigma signal, the key management system 106 determines that a less than symbol "<" should be displayed in connection with a displayable input.

As a second example, FIG. 5 shows a second access key definition 502b including a second access key command 504*b* and a second virtual key 506*b* associated with the second access key command 504*b*. As shown in FIG. 5, the second virtual key 506*b* is associated with a second key location 508*b*, which is determined to be an empty key. Based on the second key location 508*b* being mapped as an empty key (e.g., from the keyboard layout), the key management system 106 determines a second access key character 510*b* to display in conjunction with an associated selectable input. In the illustrated example, the second access key character 510*b* is determined to be a default character (e.g., a base character) of the second virtual key.

As a third example, FIG. 5 shows a third access key definition 502*c* including a third access key command 504*c* and a third virtual key 506*c* associated with the third access key command 504*c*. As shown in FIG. 5, the third virtual key 506*c* is associated with a third key location 508*c*, which is determined to include a numerical character. Based on the third key location 508*c* being mapped as a numerical key (e.g., from the keyboard layout), the key management system 106 determines a third access key character 510*c* to display in conjunction with an associated selectable input. In the illustrated example, the third access key character 510*c* is determined to be a "5" based on the third key location 508*c* including a "(" symbol as the base character and a "5" symbol as the shift character (as is the case on one or more French keyboard layouts).

As a fourth example, FIG. 5 shows a fourth access key definition 502*d* including a fourth access key command 504*d* and a fourth virtual key 506*d* associated with the fourth access key command 504*d*. As shown in FIG. 5, the fourth virtual key 506*d* is associated with a fourth key location 508*d*, which is determined to include a pair of alphabet characters ("E" and "e", as determined by the keyboard layout). Based on the fourth key location 508*d* being mapped to an "E" and an "e" (or more specifically, based on the fourth key location 508*d* not including a final sigma character (ς), not being an empty key, and not including a numeric character), the fourth access key character 510*d* may be determined to be an "E" symbol.

Figure 6A:
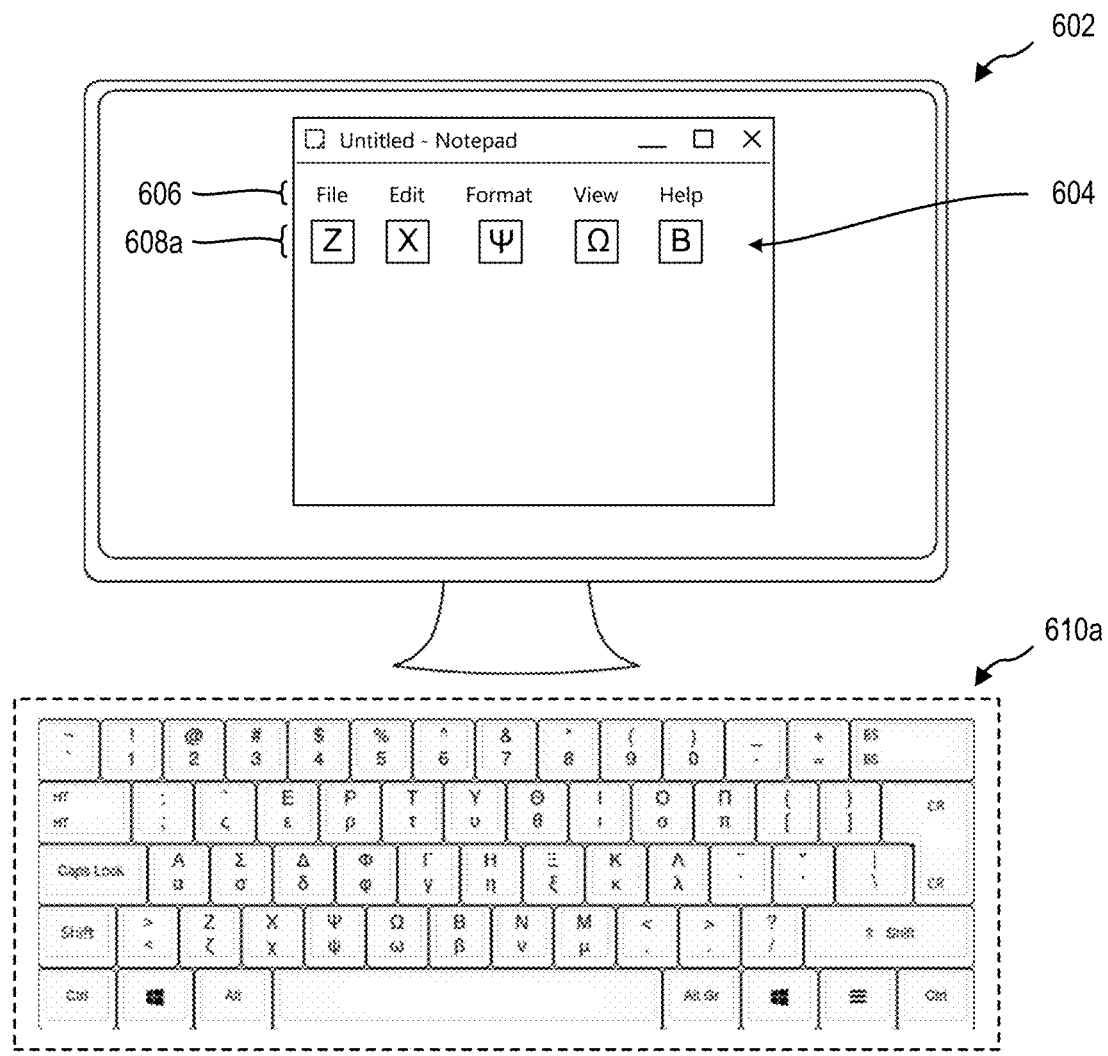
FIGS. 6A-6B illustrate example implementations in which determined access key characters are presented via a graphical user interface in accordance with one or more embodiments.
Figure 6B:
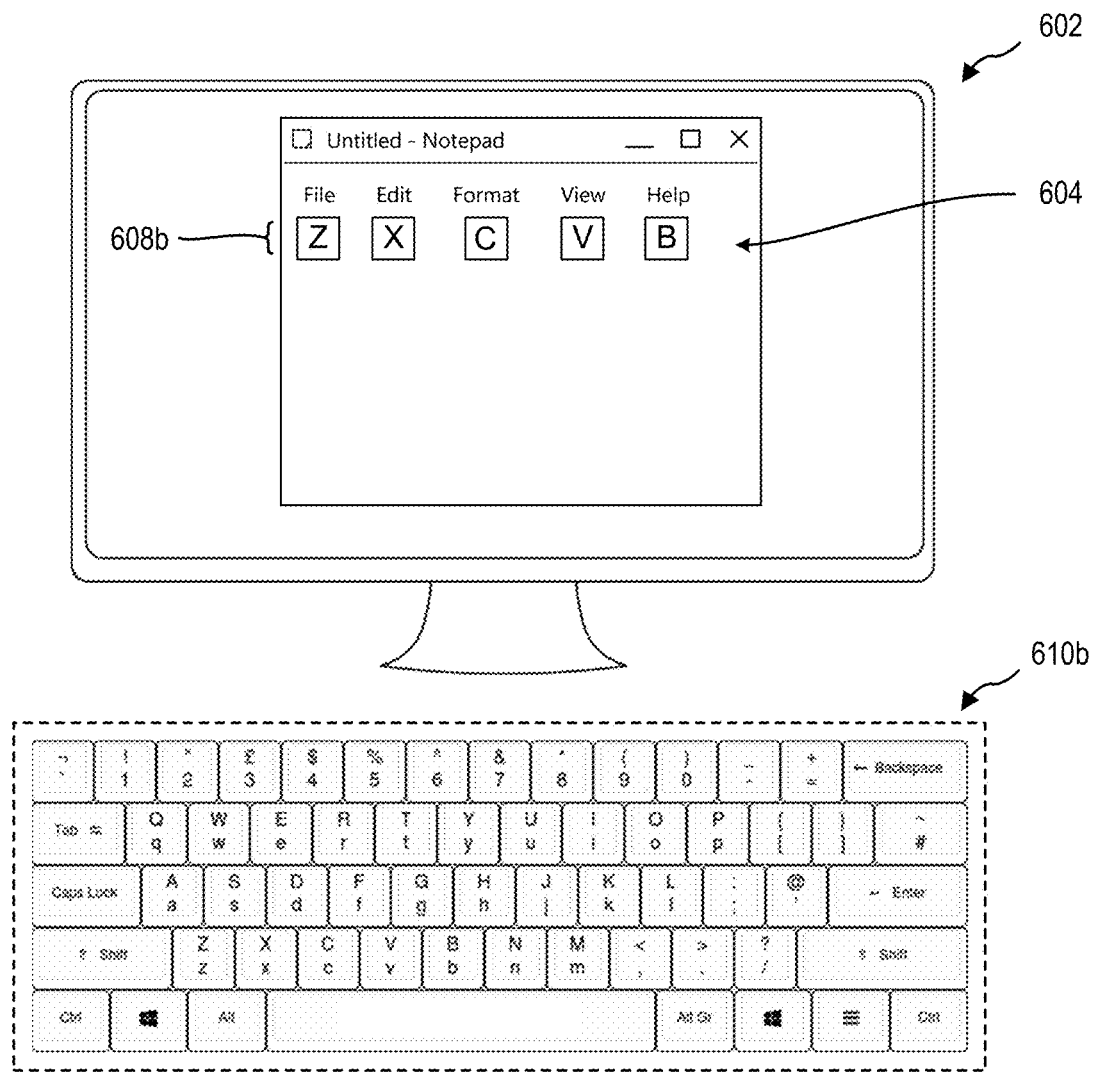

Additional use-cases in which the key management system 106 identifies access key characters for display via a GUI are described in further detail in connection with FIGS. 6A and 6B. For example, FIGS. 6A-6B illustrate use-cases of the key management system 106 showing a computing device 602 having a GUI 604 displayed thereon and running a notepad application similar to the example discussed above in connection with FIGS. 3A-3B. In particular, FIGS. 6A-6B illustrate differences in the access key characters determined and displayed based on different keyboard layouts that have been selected for the specific applications and/or computing devices.

As shown in FIG. 6A, the notepad application may include a menu of selectable icons 606 that may be selected by a cursor or through one or more keyboard accelerators. In response to identifying the menu of selectable icons 606, the key management system 106 may perform various acts described herein in connection with determining access key characters to display in conjunction with the respective selectable icons of the menu of selectable icons 606.

In the example shown in FIG. 6A, the key management system 106 may identify a keyboard layout 610*a* associated with the illustrated layout shown. In this example, the keyboard layout 610*a* is a Greek keyboard layout including Greek characters that are mapped to corresponding key locations of the keyboard layout 610*a*. Consistent with one or more embodiments described herein, the Greek characters may be mapped to key locations, which may be mapped to corresponding virtual keys. In other words, each of the virtual keys may be associated with a respective set of Greek characters based on the mapping of the Greek characters to the key locations from the keyboard layout 610*a*.

In one or more embodiments, the key management system 106 may associate an access key command to each selectable icon from the menu of selectable icons 606 (e.g., the set of displayed icons for a given view of the GUI). In one or more embodiments, the key management system 106 assigns access key commands in a particular order or based on an orientation of the virtual keys associated therewith. In the illustrated example, the key management system 106 may map the access key commands to key locations based on virtual key locations from a lower left location (e.g., the location of the "Z" character) and moving from left to right. Other implementations may follow different orientations, orders, or procedures in determining the specific assignment of the access key commands to the selectable inputs. It will be noted that because the access key commands are not localized, the access key commands may be independent from the characters that are displayed on the GUI as well as those characters that may be displayed as part of the selectable icons.

As shown in FIG. 6A, the key management system 106 may determine a first set of access key characters 608*a* for the first keyboard layout 610*a*. In this example, the key management system 106 determines a "Z" access key character to display in conjunction with the file icon. The key management system 106 may determine an "X" access key character to display in conjunction with the edit icon. The key management system 106 may determine a "ψ" access key character to display in conjunction with the format icon. The key management system 106 may determine a "Ω" access key character to display in conjunction with the view icon. The key management system 106 may determine a "B" access key character to display in conjunction with the help icon. Each of these characters may be determined using a similar process as discussed above in connection with FIG. 4. For example, each of the access key characters in this example may be determined by identifying a shift-character based on the associated key location not including a final sigma character (ς) or a numeric character and not being mapped as an empty key.

FIG. 6B illustrates a similar implementation as the example discussed above in connection with FIG. 6A based on identification of a different keyboard layout. For example, the key management system 106 may identify a second keyboard layout 610*b* and identify a set of access key characters 608*b* to display based on the second keyboard layout 610*b* and based on the mapping between the access key commands the corresponding virtual keys. In this example, keyboard layout 610*b* may refer to a Latin-based layout having a standard QWERTY layout. Identifying the different access key characters may involve a similar series of steps as discussed in connection with other implementations herein.

Moreover, while the example of FIG. 6B includes access characters 608*b* having a similar language base as the characters displayed on the GUI, it will be understood that the determination of the access key characters 608*b* is based on access key commands that are not localized and which are assigned corresponding virtual keys independent from the language displayed on the GUI. In this way, even where the display language on the GUI is non-Latin based or in a different language altogether, a user of the computing device 602 may interact with the selectable icons using access keys that are presented using characters that are selected based on the active keyboard layout 610*b* rather than a language of the application or that is displayed on the GUI 604.

Figure 7:
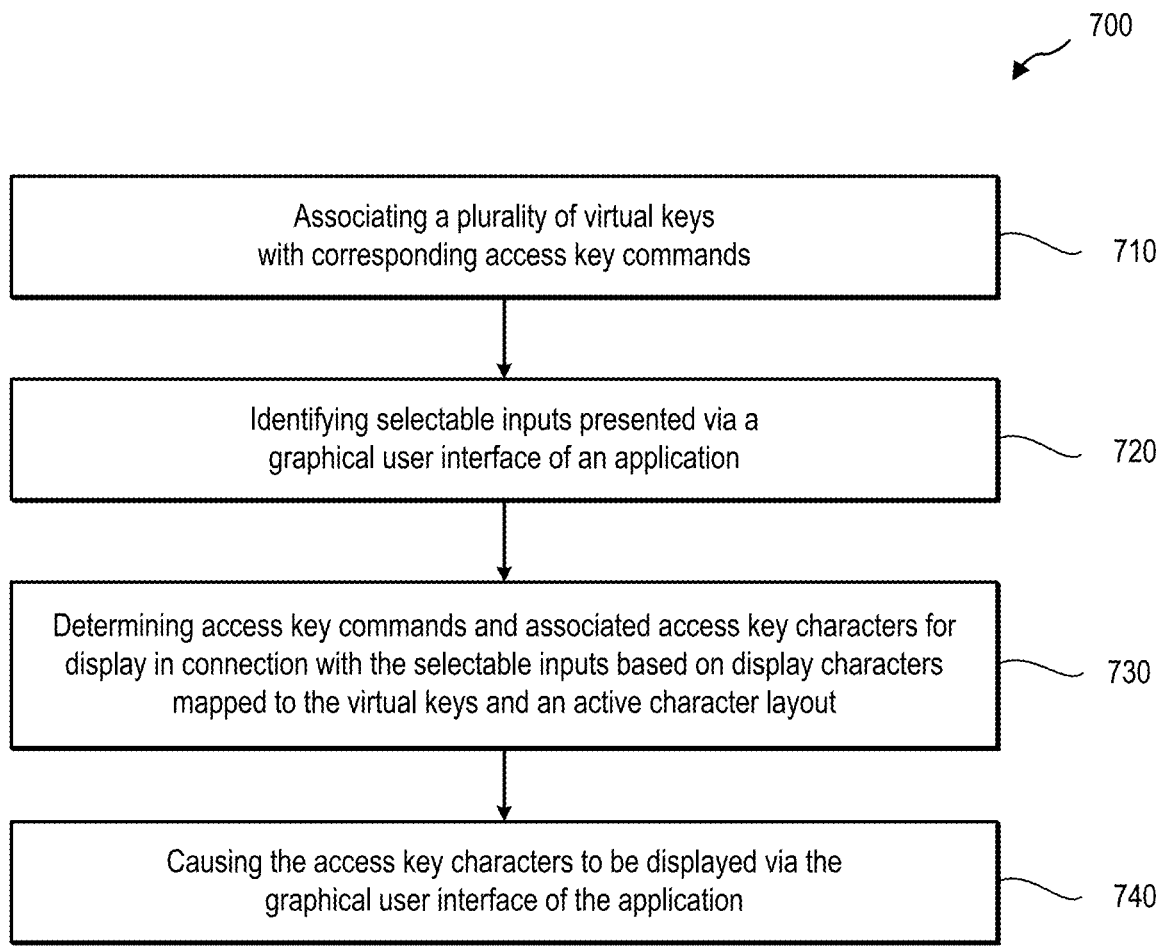
FIG. 7 illustrates an example series of acts for determining and presenting access key characters in accordance with one or more embodiments.

Turning now to FIG. 7, this figure illustrates example flowcharts including series of acts for determining an access key character to display in conjunction with a selectable option on a GUI of a client device. While FIG. 7 illustrates acts according to one or more embodiments, alternative embodiments may omit, add to, reorder, and/or modify any of the acts shown in FIG. 7. Moreover, one or more of the individual features and functionalities described in connection with individual acts or series of acts in connection with FIG. 7 may similarly apply to other embodiments and examples described herein. The acts of FIG. 7 can be performed as part of a method. Alternatively, a physical computer memory device or computer readable storage device (e.g., a non-transitory computer-readable medium) can include instructions that, when executed by one or more processors, cause a computing device to perform the acts of FIG. 7. In still further embodiments, a system can perform the acts of FIG. 7.

As indicated above, FIG. 7 illustrates a series of acts 700 for determining an access key character to display in conjunction with a selectable option on a GUI of a client device. As shown in FIG. 7, the series of acts 700 may include an act 710 of associating a plurality of virtual keys with corresponding access key commands. In one or more embodiments described herein, the act 710 may include generating a plurality of access key definitions for a character input device by associating a plurality of virtual keys with corresponding access key commands.

As further shown in FIG. 7, the series of acts 700 may include an act 720 of identifying selectable inputs presented via a GUI of an application. For example, in one or more embodiments, the act 720 includes identifying, at a runtime of an application, a plurality of selectable inputs presented via a graphical user interface of the application.

As further shown in FIG. 7, the series of acts 700 may include an act 730 of determining access key commands and associated access key characters for display in connection with the selectable inputs based on display characters mapped to the virtual keys and an active character layout. For example, in one or more embodiments, the act 730 includes determining, for each selectable input from the plurality of selectable inputs, an access key command and an associated access key character for display where determining the access key character is based on one or more display characters mapped to a key location of an associated virtual key on an active device layout of the character input device.

As further shown in FIG. 7, the series of acts 700 may include an act 740 of causing the access key characters to be displayed via the GUI of the application. In one or more embodiments, the act 740 includes causing, for each selectable input, the access key character to be displayed at the location of the selectable input via the graphical user interface of the application.

In one or more embodiments, the plurality of virtual keys are associated with corresponding key locations on a device layout template. In one or more embodiments, the access key commands are non-localized and assignable to a selectable input independent of display characters mapped to any individual location on a given character input device. In one or more embodiments, identifying the plurality of selectable inputs is triggered based on detecting a modification of selectable icons displayed on the graphical user interface of the application.

In one or more embodiments, determining the access key character for display is based on an analysis of a set of display characters mapped to the key location. For example, in one or more embodiments, when the set of display characters is determined to include a base character symbol and a shift character symbol, determining the access key character for display includes selecting the shift character symbol for display based on the set of display characters including the base character symbol and the shift character symbol.

As another example, where the set of display characters is determined to include a final sigma signal, determining the access key character for display includes selecting a less than symbol based on the set of display characters including the final sigma signal. As another example, where the set of display characters is determined to include an empty key character for a base state of the key location, determining the access key character for display includes selecting a default character pre-associated with the associated virtual key.

In one or more embodiments, identifying the plurality of selectable inputs includes identifying a first set of selectable inputs. In one or more embodiments, determining the access key command for each selectable input from the plurality of selectable inputs includes determining a first plurality of access key commands for the first set of selectable inputs. In one or more implementations, the series of acts 700 further includes identifying a second set of selectable inputs presented via the graphical user interface of the application and determining the access key command and the associated access key character for display for each selectable input from the second set of selectable inputs.

In one or more embodiments, the character input device is a keyboard device coupled to a computing device. In one or more embodiments, the character input device is a virtual keyboard presented via the graphical user interface of the application. In one or more embodiments, the application is one of an operating system of the computing device or an application including configuration instructions for each of the plurality of selectable inputs. In one or more embodiments, the active device layout refers to a non-Latin based character layout selected by a user of the computing device.

Figure 8:
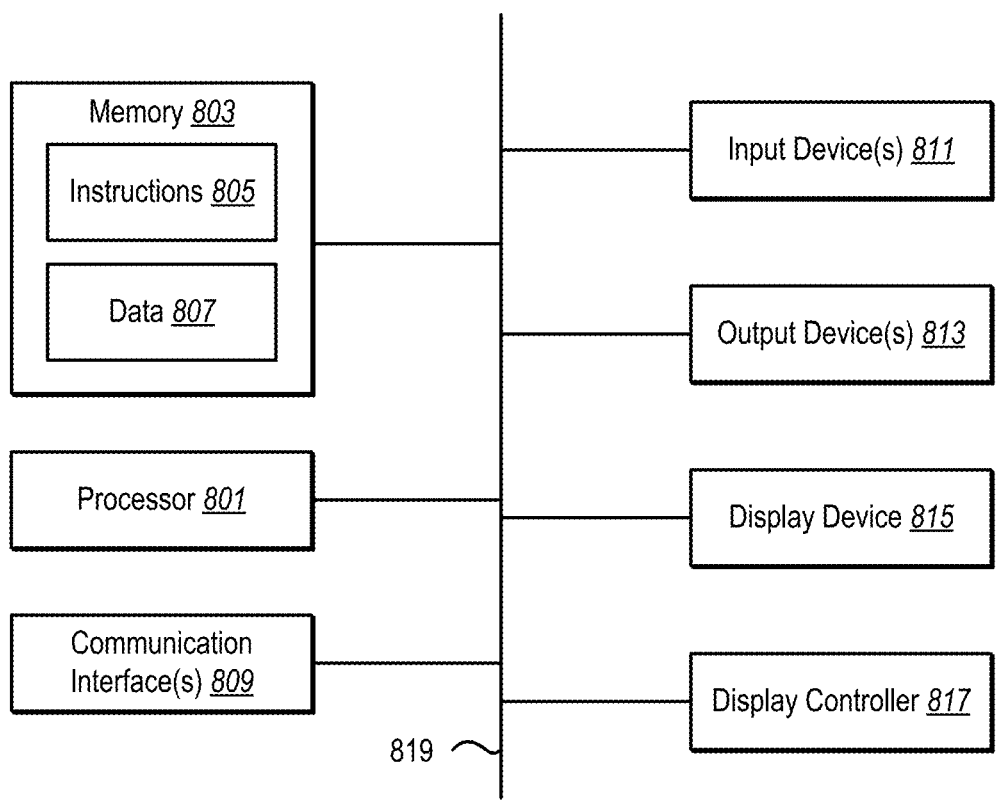
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   identifying an active layout for a character input device including identifying display characters at key locations of the character input device;
   generating a plurality of access key definitions including:
      identifying a plurality of commands for performing in connection with a computer application; and
      defining a plurality of virtual keys corresponding with the key locations of the character input device independent of the display characters at the key locations, the plurality of virtual keys each being an abstraction of an assignment of a command of the plurality of commands to a corresponding key location of the character input device; and
   at runtime of the computer application:
      identifying a first plurality of selectable inputs presented via a graphical user interface (GUI) of the computer application;
      based on the plurality of access key definitions, determining a first subset of commands of the plurality of commands that correspond to the first plurality of selectable inputs and identifying, from the plurality of virtual keys, a first subset of virtual keys that correspond to the first subset of commands;
      for each selectable input from the first plurality of selectable inputs, determining an access key character to display in connection with the selectable input based on identifying the key location assigned, via the associated virtual key, to the corresponding command and identifying the display character on the active layout of the character input device at that key location;
      detecting a modification to a display area of the GUI resulting in a second plurality of selectable inputs being presented via the GUI;
      based on the plurality of access key definitions, determining a second subset of commands of the plurality of commands that correspond to the second plurality of selectable inputs and identifying, from the plurality of virtual keys, a second subset of virtual keys that correspond to the second subset of commands;

determining a modified set of access key characters to display in connection with the second plurality of selectable inputs, including, for each selectable input from the second plurality of selectable inputs, determining an associated access key character for the corresponding virtual key; and causing the modified set of access key characters to be displayed within the display area of the GUI.

2. The method of claim 1, wherein the selectable inputs of the first plurality of selectable inputs and of the second plurality of selectable inputs are in a different language than the associated access key characters and the display characters of the active layout of the character input device based on assigning selectable inputs through virtual keys to a key location of the character input device and independent of a display character of the active layout of the character input device.

3. The method of claim 1, wherein the plurality of commands are non-localized and assignable to selectable inputs independent of display characters mapped to any individual location on the character input device.

4. The method of claim 1, wherein detecting the modification to the display area is triggered based on detecting a selection of a first input of the first plurality of selectable inputs presented via the GUI of the computer application.

5. The method of claim 1, wherein detecting the modification to the display area is triggered based on a scrolling action that causes the modification to the display area resulting in a display of one or more additional selectable icons.

6. The method of claim 1, wherein the character input device is one or more of:
a keyboard device coupled to a computing device; or
a virtual keyboard presented via the graphical user interface of the computer application.

7. The method of claim 1, wherein the computer application is one of an operating system of a computing device or a software application including configuration instructions for each of the first plurality of selectable inputs.

8. The method of claim 1, wherein the display characters mapped at the key locations are based on the active layout selected prior to or when the computer application is opened.

9. The method of claim 8, wherein the active layout is one of a plurality of possible device layouts, each of the plurality of possible device layouts having different display characters mapped to the key locations of the character input device.

10. The method of claim 8, wherein the active layout refers to a non-Latin based character layout selected by a user of a computing device on which the computer application is running.

11. A system, comprising:
at least one processor;
memory in electronic communication with the at least one processor; and
instructions stored in the memory, the instructions being executable by the at least one processor to:
identify an active layout for a character input device including identifying display characters at key locations of the character input device;
generate a plurality of access key definitions including:
identifying a plurality of commands for performing in connection with a computer application; and
defining a plurality of virtual keys corresponding with the key locations of the character input device independent of the display characters at the key locations, the plurality of virtual keys each being an abstraction of an assignment of a command of the plurality of commands to a corresponding key location of the character input device; and at runtime of the computer application:
identify a first plurality of selectable inputs presented via a graphical user interface (GUI) of the computer application;
based on the plurality of access key definitions, determine a first subset of commands of the plurality of commands that correspond to the first plurality of selectable inputs and identify, from the plurality of virtual keys, a first subset of virtual keys that correspond to the first subset of commands;
for each selectable input from the first plurality of selectable inputs, determine an access key character to display in connection with the selectable input based on identifying the key location assigned, via the associated virtual key, to the corresponding command and identifying the display character on the active layout of the character input device at that key location;
detect a modification to a display area of the GUI resulting in a second plurality of selectable inputs being presented via the GUI;
based on the plurality of access key definitions, determine a second subset of commands of the plurality of commands that correspond to the second plurality of selectable inputs and identify, from the plurality of virtual keys, a second subset of virtual keys that correspond to the second subset of commands;
determine a modified set of access key characters to display in connection with the second plurality of selectable inputs, including, for each selectable input from the second plurality of selectable inputs, determining an associated access key for the corresponding virtual key; and
cause the modified set of access key characters to be displayed within the display area of the GUI.

12. The system of claim 11, wherein the selectable inputs of the first plurality of selectable inputs and of the second plurality of selectable inputs are in a different language than the associated access key characters and the display characters of the active layout of the character input device based on assigning selectable inputs through virtual keys to a key location of the character input device and independent of a display character of the active layout of the character input device.

13. The system of claim 11, wherein the plurality of commands are non-localized and assignable to selectable inputs independent of display characters mapped to any individual location on the character input device.

14. The system of claim 11, wherein detecting the modification to the display area is triggered based on:
detecting a selection of a first input of the first plurality of selectable inputs presented via the GUI of the computer application; or
a scrolling action that causes the modification to the display area resulting in a display of one or more additional selectable icons.

15. The system of claim 11, wherein the character input device is one or more of:
   a keyboard device coupled to a computing device; or
   a virtual keyboard presented via the graphical user interface of the computer application.

16. The system of claim 11, wherein the computer application is one of an operating system of a computing device or a software application including configuration instructions for each of the first plurality of selectable inputs.

17. The system of claim 11, wherein the display characters at the key locations are based on the active layout selected prior to or when the computer application is opened.

18. The system of claim 17, wherein the active layout is one of a plurality of possible device layouts, each of the plurality of possible device layouts having different display characters mapped to the key locations of the character input device.

19. The system of claim 17, wherein the active layout refers to a non-Latin based character layout selected by a user of a computing device on which the computer application is running.

20. A non-transitory computer readable medium storing instructions thereon that, when executed by at least one processor, causes a computing device to:
   identify an active layout for a character input device including identifying display characters at key locations of the character input device;
   generate a plurality of access key definitions including:
      identifying a plurality of commands for performing in connection with a computer application; and
      defining a plurality of virtual keys corresponding with the key locations of the character in put device independent of the display characters at the key locations, the plurality of virtual keys each being an abstraction of an assignment of a command of the plurality of commands to a corresponding key location of the character input device; and
   at runtime of the computer application:
      identify a first plurality of selectable inputs presented via a graphical user interface (GUI) of the computer application;
      based on the plurality of access key definitions, determine a first subset of commands of the plurality of commands that correspond to the first plurality of selectable inputs and identify, from the plurality of virtual keys, a first subset of virtual keys that correspond to the first subset of commands;
      for each selectable input from the first plurality of selectable inputs, determine an access key character to display in connection with the selectable input based on identifying the key location assigned, via the associated virtual key, to the corresponding command and identifying the display character on the active layout of the character input device at that key locations;
      detect a modification to a display area of the GUI resulting in a second plurality of selectable inputs being presented via the GUI;
      based on the plurality of access key definitions, determine a second subset of commands of the plurality of commands that correspond to the second plurality of selectable inputs and identify, from the plurality of virtual keys, a second subset of virtual keys that correspond to the second subset of commands;
      determine a modified set of access key characters to display in connection with the second plurality of selectable inputs, including, for each selectable input from the second plurality of selectable inputs, determining an associated access key for the corresponding virtual key; and
      cause the modified set of access key characters to be displayed within the display area of the GUI.

* * * * *